United States Patent [19]

Overbay

[11] Patent Number: 4,696,102
[45] Date of Patent: Sep. 29, 1987

[54] COLLET TYPE GRIPPER

[75] Inventor: Mark A. Overbay, East Ridge, Tenn.

[73] Assignee: Combustion Engineering, Inc., Windsor, Conn.

[21] Appl. No.: 816,609

[22] Filed: Jan. 6, 1986

[51] Int. Cl.[4] .......................... B23P 15/26; B23P 19/04
[52] U.S. Cl. ..................................... 29/726; 29/426.5;
29/402.03; 29/282; 81/444
[58] Field of Search ............... 29/402.03, 426.1, 426.5,
29/726, 234, 282, 263, 261; 81/3.05, 53.2, 443,
444, 446

[56] References Cited

U.S. PATENT DOCUMENTS

| 812,088 | 2/1906 | Pierce | 81/3.05 |
| 4,214,362 | 7/1980 | Beard | 29/726 |

FOREIGN PATENT DOCUMENTS 427850  4/1926  Fed. Rep. of Germany ........ 29/263

*Primary Examiner*—Howard N. Goldberg
*Assistant Examiner*—Ronald S. Wallace

*Attorney, Agent, or Firm*—John H. Mulholland

[57] ABSTRACT

Apparatus (16) for gripping the inner surface of a plug (14) so that it can be removed from a tube (12). The apparatus includes a shaft (18) having an enlarged frustoconical head (20) with a collar member (24) surrounding the shaft. The collar has a plurality of flexible fingers (22) extending up therefrom, which are forced radially outwardly into contact with the inner wall of the plug when the head is moved longitudinally outwardly from the plug. Each finger has an end portion which is tapered and forms first (10 degrees) and second (5 degrees) angles on its inner (32) and outer (30) surfaces, respectively; and the frustoconical surface (34) of the enlarged head forms a third angle (15 degrees), with the sum of the first and second angles being equal to the third angle. The end portions of the fingers are thus moved radially outwardly, such that their outer surface lies parallel with the inner surface of the plug and thus, the plug is gripped over a large surface area by the gripping mechanism.

2 Claims, 3 Drawing Figures

4,696,102

COLLET TYPE GRIPPER

BACKGROUND OF THE INVENTION

In tube and sheet heat exchangers, for example those used in a nuclear steam generator, problems are encountered in the form of tubes which become defective or damaged. In the past, these tubes were removed from operation by welding plugs into each end during a maintenance shutdown, and thereafter continuing the later operation of the steam generator with reduced capacity with the remaining tubes in operation. This form of maintenance is satisfactory until so many of the tubes are plugged as to make it economically unfeasible to continue operation at the reduced capacity. Thus, instead of doing the above, the tubes are presently plugged by plugs that can be removed at a later time. These plugs are mechanically expanded into the tubes without any welding being done. When too many tubes have been removed from operation, the unit is shutdown, the plugs are removed and the tubes are inspected and tested to see which of the defective tubes can be effectively repaired, for example by sleeving. If enough tubes can be repaired, the useful life of the steam generator can be greatly extended. The plugs are generally loosened by means of a tool which spirals an electrical arc along the inside surface of the plug wall. As the arc melts a portion of its inner surface, the forces of solidification cause the wall of the plug to contract or shrink back, close to the original size that it was before it was expanded into the defective tube. A gripping mechanism is then used for pulling the plug from the tube end. Care must be take during this action so as not to cause damage to the tubes.

SUMMARY OF THE INVENTION

In accordance with the invention, there is provided a gripping mechanism for gripping the inside surface of a plug so that the plug can be removed from the end of a tube. The gripping mechanism includes a shaft having an enlarged end, with a hollow member surrounding the shaft, the hollow member having a plurality of flexible fingers extending therefrom, located so that when the shaft is moved longitudinally outwardly of the plug, the ends of the fingers are moved radially outwardly by the enlarged end of the shaft into tight gripping engagement with the plug. Each finger has an end portion which is tapered and forms first and second angles with the vertical on its inner and outer surfaces, and the enlarged end of the shaft is frustoconical, forming a third angle with the vertical, with the first and second angles being such that together they equal the third angle. Thus, when the enlarged first end of the shaft is moved axially outwardly, the fingers are moved radially outwardly such that the outer surfaces of the end portions lie parallel with the inner surface with the plug, and thus it is gripped over a large surface area.

DESCRIPTION OF THE PREFERRED EMBODIMENT

Figure 1:
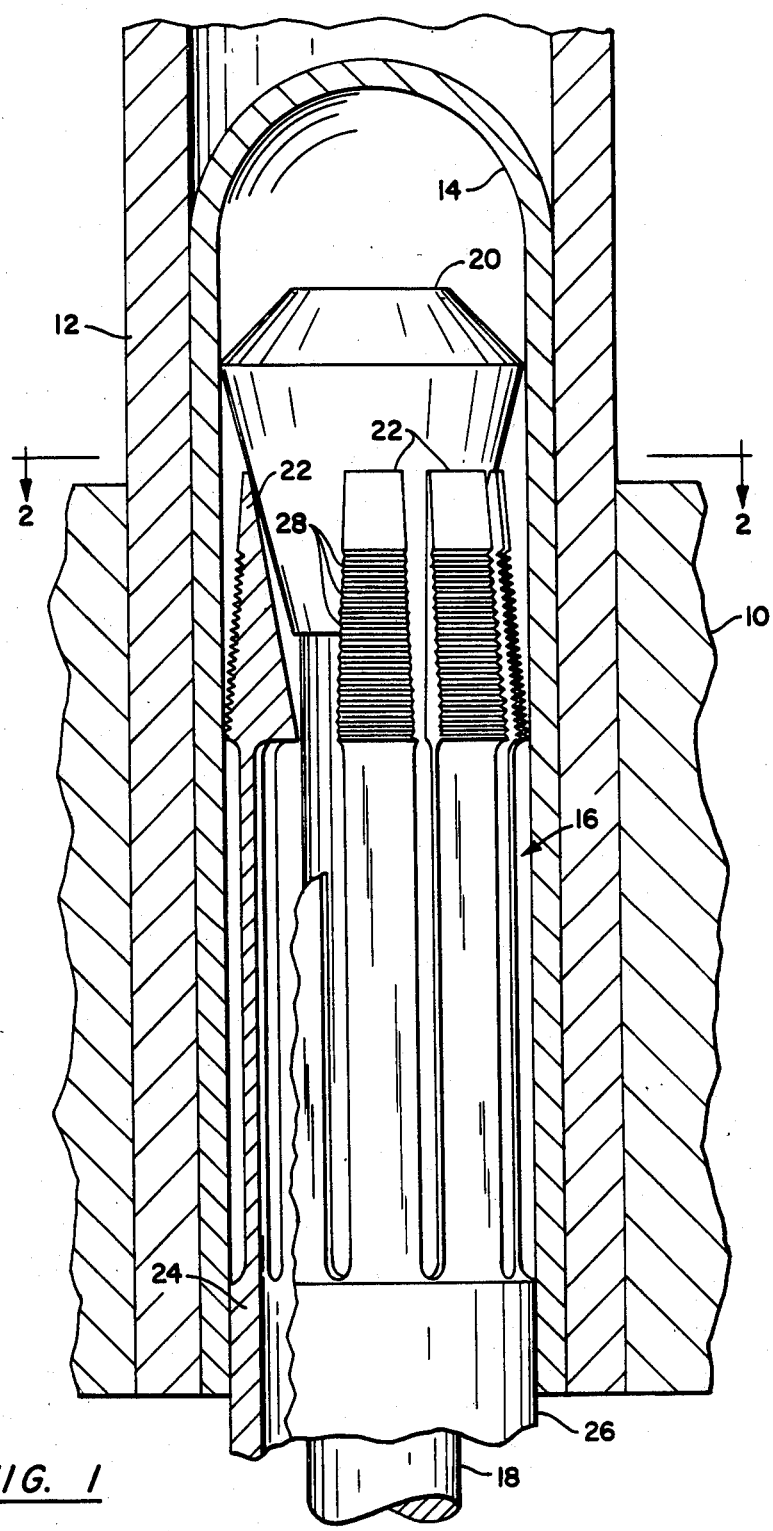
FIG. 1 is a view with parts partially broken away, of a plug gripping mechanism constructed in accordance with the invention.
Figure 2:
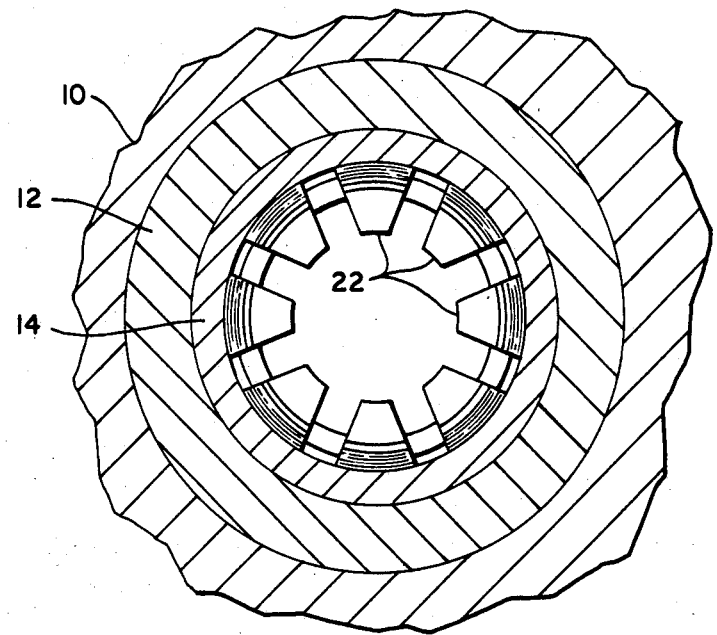
FIG. 2 is a view taken on line 2—2 of FIG. 1 with the expanding member omitted.

Looking now to FIGS. 1 and 2, a tube sheet 10 of a nuclear steam generator is partially shown, which has a plurality of tubes 12 (one of which is shown) secured thereto. Tube 12 has a plug 14 therein, which had been placed in the tube to effectively remove it from operation. The tube had been mechanically expanded into the tube during a shutdown of the unit. A later time, during another shutdown period, the plug was initially loosened in the tube, for example by using a welding electrode to heat the inside of the plug, causing it to shrink back to close to its original size. The means used for initially loosening the plug forms no part of the present invention, and any suitable means could be used.

The plug removing tool 16 of the invention is initially positioned in plug 14 by any suitable means (not shown). The tool consists of a central shaft 18, having an enlarged frustoconical head 20 at the inner end thereof. Surrounding the head 20 and shaft 18 are a plurality of flexible fingers 22 extending up from a collar member 24. Any number of fingers can be used, therebeing eight shown (FIG. 2). The plug 14 is gripped and removed from the tube 12 in the following manner. After the tool has been properly positioned in the plug, shaft 18 is withdrawn longitudinally outwardly, moving the head 20 in a manner to engage the fingers 22 and forcing them radially outwardly into tight engagement with the inner walls of the plug. An extension 26 of the collar 24 is then moved longitudinally outwardly, or away from the tube thus, pulling the plug 14 from the tube.

Figure 3:
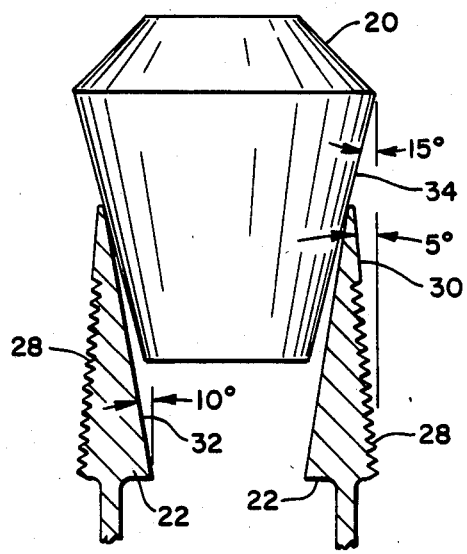
FIG. 3 is a sectional side view of the fingers and the enlarged head of the expanding member, showing the relative angles which the various members form.

Since the fingers 22 grip the plug 14 of a large surface area, the tool can remove the plugs that are in very tight engagement with the tube wall without causing damage to such tube. The outer surfaces of the end portions of each fingers are serrated at 28 for a better gripping action. As shown in FIG. 3, the inner and outer surfaces of the end portions of each finger lie at predetermined angles to the vertical, as does the outer surface of the frustoconical head 20 of the expanded member which comes into contact with the fingers. These angles are selected such that after the end portions of the fingers have been expanded into tight engagement with the inner wall of plug 14, the outer surface of each finger lies parallel with the axis of the plug, or the cylindrical wall of the plug, so that they contact such wall over a large surface area. This creates a large gripping force, without running the risk of deforming or damaging the plug and the tube wall. As shown in FIG. 3, the outer surface 30 of the end portions of each finger lies at a 5 degree angle with the vertical; the inner surface 32 of each finger lies at a 10 degree angle with the vertical; and the frustoconical 34 of the enlarged head 20 lies at an angle of 15 degrees. In other words, the angles formed by the inner and outer surfaces of the end portions of the fingers should equal the angle of the taper of frustoconical head 20. Since the purpose of removing the plug is so that the tube can be repaired and placed back into operation as heat exchange surface, it is essential that no damage be caused to the tube during removal of the plug. The plug removal tool of the invention accomplishes this, even if the plug is tightly secured to the inner wall of the tube

I claim.

1. In combination, a member having an inner wall forming a cylindrical opening, gripping means for tightly gripping the inner wall of the member, said gripping means including a shaft having an enlarged first end extending into the cylindrical opening, and a second end located outside of the member, a hollow member surrounding the shaft, the hollow member having a plurality of flexible metal fingers extending therefrom towards the enlarged first end of the shaft, the end portion of each finger being tapered at given first and second angles on its inner and outer surfaces, respectively; and the enlarged first end of the shaft being frustoconical and forming a third given angle, the first and second angles being such that together they equal the third angle, so that when the enlarged first end of the shaft is moved axially outwardly of the cylindrical opening, the fingers are moved radially outwardly thereby, and the outer surface of the end portions lie parallel to the inner wall of the cylindrical opening and thus, each finger end portion engages the inner wall over a large surface area.

2. The combination set forth in claim 1, wherein the first angle is approximately 10 degrees; the second angle is approximately 5 degrees, and the third angle is approximately 15 degrees.

* * * * *